United States Patent [19]

Reininghaus et al.

[11] Patent Number: 5,898,915
[45] Date of Patent: Apr. 27, 1999

[54] METHOD AND SYSTEM FOR MONITORING THE FEES ARISING FOR CALLS IN A MOBILE RADIOTELEPHONE SYSTEM

[75] Inventors: Georg Reininghaus; Stanislav Dzuban, both of Vienna, Austria

[73] Assignee: Siemens Aktiengesellschaft, Munich, Germany

[21] Appl. No.: 08/652,354

[22] Filed: May 23, 1996

[30] Foreign Application Priority Data

May 30, 1995 [DE] Germany ............................ 195 19 766

[51] Int. Cl.⁶ ................................................ H04M 11/00
[52] U.S. Cl. ........................... 455/406; 455/408; 455/409
[58] Field of Search .................................. 379/114, 115, 379/121, 144; 455/405, 406, 407, 408, 409, 410, 432, 433, 436

[56] References Cited

U.S. PATENT DOCUMENTS

| | | |
|---|---|---|
| 5,109,401 | 4/1992 | Hattori et al. . |
| 5,291,543 | 3/1994 | Freese et al. . |
| 5,321,735 | 6/1994 | Breeden et al. ........................ 455/409 |
| 5,450,477 | 9/1995 | Amarant et al. ........................ 379/144 |
| 5,479,481 | 12/1995 | Koivunen ................................ 455/433 |
| 5,517,555 | 5/1996 | Amadon et al. ........................ 455/408 |

OTHER PUBLICATIONS

European Telecommunications Standards Institiute, Jul. 1994, Final Draft, prETs 300 510, European Digital Cellular Telecommunications System (Phase 2); Description Of Charge Advice Information; pp. 1–15.

Primary Examiner—Edward F. Urban
Assistant Examiner—Thuan T. Nguyen
Attorney, Agent, or Firm—Hill & Simpson

[57] ABSTRACT

In the method and system for monitoring the fees arising for calls in a mobile radiotelephone system, billing data is offered and a charge limit (CL) is defined for every individual call, a limited calling time (TA) for the respective call being calculated on the basis thereof. In parallel to the limitation of the call to a specific time duration, a monitoring function is started at every call with which the call is automatically cleared down upon expiration of the limited calling time (TA). By the limitation of the calling time per call and by the monitoring function, the charges incurred during the respective call cannot exceed an upper limit and a misuse of the mobile radiotelephone system, particularly given forwarded or transferred calls, is avoided in a simple manner.

18 Claims, 3 Drawing Sheets

METHOD AND SYSTEM FOR MONITORING THE FEES ARISING FOR CALLS IN A MOBILE RADIOTELEPHONE SYSTEM

BACKGROUND OF THE INVENTION

The present invention is directed to a method for monitoring the fees arising for calls in a mobile radiotelephone system.

It is known to levy the fees arising for calls in a telephone system as a function of the service respectively used by the subscribers, these fees being composed of fixed monthly charges and/or variable call charges. The payment ensues by cash payment, by employing telephone cards or by debiting from an account. In a mobile radiotelephone system, the charges arising during a call are evaluated, for example, in real time and are collected in a debit center for billing. This causes a considerable signalling load in the mobile radiotelephone system.

It is desirable to limit the fees that arise due to redirected and/or forwarded calls since mobile radiotelephone subscribers have themselves called by appointment in order to activate the destination number requested by a caller (for example, from a foreign country) to the which the call is to be redirected or forwarded. In this way, the mobile radiotelephone subscriber repeatedly appears as a switching center, so that potentially expensive call (for example, longer-duration international calls) are conducted via the subscriber without the operator of the mobile radiotelephone system being able to monitor the charges. When the caller making use of the call forwarding or the call transfer does not pay the charges, then the mobile radiotelephone system is being fraudulently used. A high signalling load arises when a call forwarding or a call transfer is active for mobile radiotelephone subscribers and every forwarded or transferred call must be reported to a central location in the mobile radiotelephone system for monitoring reasons.

SUMMARY OF THE INVENTION

It is an object of the present invention to provide a method and system for monitoring the fees arising for calls in a mobile radiotelephone system with which a simple fee monitoring given optimally low signalling load can be implemented.

In general terms the present invention is a method for monitoring the fees arising for calls in a mobile radiotelephone system that has mobile stations, base stations and mobile switching centers, as well as, datafiles for storing the subscriber data of mobile radiotelephone subscribers. A charge limit is defined and billing data is offered for every individual call in the mobile radiotelephone system. A limited calling time is calculated for the respective call on the basis of the charge limit and the billing data and a monitoring function is started with which the call is automatically cleared down after expiration of the limited calling time.

Advantageous developments of the present invention are as follows.

Given a call departing from the mobile station or, respectively, arriving in the mobile station, the charge limit is offered by a visitor datafile that stores the subscriber data of the calling mobile radiotelephone subscriber or, respectively, the subscriber data of the called mobile radiotelephone subscriber. The charge limit is transmitted to the mobile switching center responsible for the mobile radiotelephone subscriber that calculates the limited calling time and transmits a cleardown message after expiration of the limited calling time.

Given a call forwarding established for the mobile radiotelephone subscriber, the charge limit and forwarding data are offered by a visitor datafile that stores the subscriber data of the mobile radiotelephone subscriber and are transmitted to the mobile switching center responsible for the mobile radiotelephone subscriber that calculates the limited calling time, starts the monitoring function and transmits the cleardown message after expiration of the limited calling time.

Given a call forwarding established for the mobile radiotelephone subscriber, the charge limit and forwarding data are offered by a home datafile that stores the subscriber data of the mobile radiotelephone subscriber and are transmitted to a mobile switching center that calculates the limited calling time, starts the monitoring function and transmits the cleardown message after expiration of the limited calling time.

The mobile switching center sends the cleardown message to a mobile station of a calling mobile radiotelephone subscriber in the mobile radiotelephone system. Alternatively, the mobile switching center sends the cleardown message to a fixed network subscriber station of a calling subscriber in a line-bound communication network.

Given a call transfer established for the mobile radiotelephone subscriber wherein the mobile radiotelephone subscriber accepts a call from a third subscriber during a call that has already been set up or directs it to a third subscriber, the charge limit is offered by a visitor datafile storing the subscriber data of the mobile radiotelephone subscriber. This charge limit is transmitted to the mobile switching center responsible for the mobile radiotelephone subscriber that calculates the limited calling time for the call transferred to the third subscriber, starts the monitoring function and sends at least one cleardown massage as soon as one of the limited calling times has expired.

The mobile switching center sends the cleardown message to a switching equipment provided for the other subscriber affected by the call.

A visual or acoustic information about the impending cleardown of the call is sent by the mobile switching center before the expiration of the limited calling time. After reception of the information about an impending cleardown of the call by the mobile station, the limited calling time is automatically extended by transmission of a short message to the mobile switching center or by making use of a corresponding service in the mobile radiotelephone system.

The present invention is also a system for monitoring the fees arising for calls in a mobile radiotelephone system that has mobile stations, base stations and mobile switching centers, as well as, datafiles for storing the subscriber data of mobile radiotelephone subscribers. A charge limit is defined and billing data are offered for every individual call in the mobile radiotelephone system. A limited calling time is calculated for the respective call on the basis of the charge limit and the billing data and a monitoring function is started with which the call is automatically cleared down after expiration of the limited calling time.

According thereto, billing data are offered for every individual call and a charge limit is defined with reference whereto a limited call time is calculated for the respective call. Parallel to limiting the call to a specific time duration, a monitoring function is started at every call with which the call is automatically cleared down upon expiration of the limit call time. The charge limit thereby represents an upper limit for the charges incurred during the call, whereby the charge limit can be uniformly defined for all mobile radiotelephone subscribers in the radiotelephone system or can be individually defined for individual mobile radiotelephone subscribers. What this monitoring function assures is that the permitted call duration for every individual call is not exceeded and, thus, a misuse of the mobile radiotelephone system, particularly given forwarded or transferred call is avoided with little outlay.

The signalling load that additionally derives is negligible since the charge limit and the billing data can be handled like subscriber data of the mobile radiotelephone subscriber. No new interfaces need be defined for monitoring the incurred charges in the new method since the parameters needed for the calculation of the limited calling time, stored as subscriber data in the existing datafiles of the mobile radiotelephone system, are transmitted in the existing signalling protocol of the mobile radiotelephone system. There is greater comfort for the mobile radiotelephone subscribers because an unintentional transgression of the charge limit during a call is precluded and uncontrolled expensive calls can be avoided. The inventive method offers the advantage for the operators of the mobile radiotelephone systems that a "dedicated line" does not exist for fraudulent use and calls with high charges remain unmonitored. A repeated transgression of the billing, which is usually to be paid on a monthly basis, is no longer possible due to the definition of a limit calling time per call.

It is advantageous when, given a call departing the mobile station or, respectively, arriving at the mobile station, the charge limit is offered by a visitor datafile and is transmitted to a mobile switching center that calculates the limited calling time, starts the monitoring function and sends a cleardown message upon expiration of the limited calling time.

It is especially advantageous when the inventive method is employed given a call forwarding established for the mobile radiotelephone subscriber or, respectively, given a call transfer established for the mobile radiotelephone subscriber. The charge limit and the forwarding data can likewise be offered by the visitor datafile dependent on the type of call forwarding and can be transmitted to a mobile switching center that automatically effects the calculation of the limited calling time, the starting of the monitoring function and the transmission of the cleardown message. An alternative solution for specific types of call forwarding provides that the charge limit and the forwarding data are offered by a home datafile and are sent to the mobile switching center for initiating the further steps, including the transmission of the cleardown message upon expiration of the limited calling time.

It is also especially advantageous when, given a call transfer established for the calling mobile radiotelephone subscriber wherein the call is transferred from the mobile radiotelephone subscriber already conducting a call to a third subscriber, the charge limit and transfer data are likewise offered by a visitor datafile and are transmitted to the pertinent mobile switching center for initiating the further steps.

It is also advantageous when, before expiration of the calculated, limited calling time, an acoustic or visual information is sent regarding the impending cleardown message. An extension of the limited calling time is possible by transmitting a short message from the mobile station to the mobile switching center or by making use of a service offered therefor in the mobile radiotelephone system.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
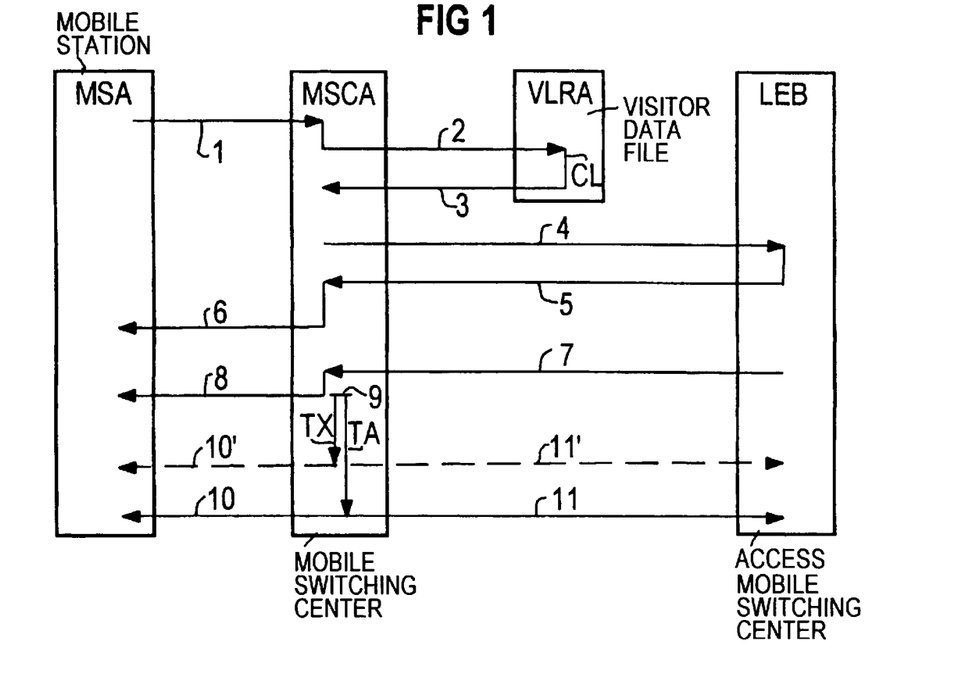
FIG. 1 is a flowchart for the charge monitoring given a call departing the mobile station.

FIG. 1 shows the function sequence for monitoring the charges incurred in a mobile radiotelephone system given a call departing a mobile station MSA (mobile originated call). The call is initiated by a mobile radiotelephone subscriber by actuation of the mobile station MSA, is forwarded via a radio transmission channel to a base station and from the latter to a mobile switching center MSCA via a trunk. A visitor datafile VLRA in which the subscriber data of the mobile radiotelephone subscribers currently serviced by the mobile switching center MSCA is temporarily stored is coupled to the mobile switching center MSCA. Let it be assumed that the called subscriber is a fixed network subscriber of a different communication system (for example, of the public telephone system), so that the outgoing call sets up a connection from the mobile switching center MSCA to a switching equipment LEB of the telephone system that is provided for the called fixed network subscriber.

The allocation of a radio transmission channel between the mobile station MSA and the base station as well as between the base station and the mobile switching center MSCA ensues before the actual call connection can be set up given the call outgoing from the mobile station MSA. Via a signalling channel, the mobile station MSA sends a service request to the mobile switching center MSCA with which mobility functions that, for example, have the authentication, the encoding and/or the allocation of a temporary mobile radiotelephone subscriber identification number, etc., are requested.

As soon as the mobility functions are successfully implemented and a message with respect thereto is answered back to the mobile station MSA, the mobile station MSA begins the set up of the actual call connection with transmission of a message to the mobile switching center MSCA wherein a request is made for the setup of the connection (1). This message for the call setup contains, among other things, the destination call number selected by the mobile radiotelephone subscriber and information about the requested service. The mobile switching center MSCA requests the subscriber data of the mobile radiotelephone subscriber from the appertaining visitor datafile VLRA (2). The authorization of the mobile radiotelephone subscriber to use the requested service can be checked on the basis of the stored subscriber data. According to the present invention, a charge limit CL, which is preferably entered in the visitor datafile VLRA individually for the mobile radiotelephone subscriber as subscriber datum, is defined for the outgoing call and is transmitted to the mobile switching center MSCA as reply to the request of subscriber data (3). Over and above this, billing data of the mobile switching center MSCA are also made available, these being likewise entered in the visitor datafile VLRA as, for example, data of an auxiliary service "charge acquisition" (advice of charging) established for the mobile radiotelephone subscriber. The billing data are composed, for example, of a plurality of parameters that are operated according to a formula defined for the GSM standard (Global System for Mobile Communication) to form a result about the charges incurred.

The digits of the selected destination call number are interpreted by the mobile switching center MSCA in order to transmit a message for the call setup (initial address message) in a free transmission channel of a transmission frame to the switching equipment LEB provided for the called fixed network subscriber (4). After reception of a call signal from the switching equipment LEB (5), the mobile switching center MSCA informs that mobile station MSA that the fixed network subscriber station of the called fixed network subscriber has sent the call signal (6). The call signal indicates the ringing of the subscriber station of the fixed network subscriber. As soon as the fixed network subscriber answers, a corresponding message is transmitted from the switching equipment LEB to the mobile switching center MSCA (7) and is communicated from the mobile switching center MSCA to the mobile station MSA (8). The call connection between the fixed network subscriber station and the mobile station MSA has thus been through-connected.

As a rule, the charge acquisition in the mobile switching center MSCA begins with the reception of the message about the successful call setup to the called fixed network subscriber. According to the present invention, the mobile switching center MSCA calculates a limited calling time TA on the basis of the communicated charge limit CL and the billing data for the respective call given a call outgoing from the mobile station MSA and starts a monitoring function (9). In the simplest case, the monitoring function is comprised therein that a timer is set to the limited calling time TA. Insofar as it is not previously prematurely broken off by one of the two subscribers, the call connection is maximally maintained until the limited calling time TA has expired. Upon expiration of the permitted calling time TA, the call is automatically ended by the transmission of a cleardown message from the mobile switching center MSCA to the mobile station MSA (10) and/or to the switching equipment LEB (11). The charges that have been incurred for the call are collected and supplied to an evaluation for debiting the charges for the calling mobile radiotelephone subscriber. Shortly before the expiration of the allowed calling time TA, for example after the predetermined time TX, the mobile radiotelephone subscriber or the fixed network subscriber or both subscribers can be visually or acoustically alerted to the impending end of the call connection in that the mobile switching center MSCA transmits an announcement or a short message to the mobile station MSA (10') and/or to the switching equipment LEB (11').

The charge limit CL represents an upper limit for the charges arising given a single call and can be defined individually for the mobile radiotelephone subscriber (as in the present exemplary embodiment) or can be uniformly defined for all mobile radiotelephone subscribers by the respective operator of the mobile radiotelephone system. What is assured by calculating an allowed calling time per individual call and monitoring the calculated calling time with a timer is that the charges for the individual call do not exceed the defined charge limit. The limitation of the calling time directly in the mobile switching center avoids a higher signalling load that would be required given interpretation and collection in real time of the charges incurred for every individual call. Moreover, the calls of the mobile radiotelephone subscribers need not be centrally monitored system-wide in order to detect a misuse of the mobile radiotelephone system and accept the considerable, additional signalling load required therefor. As a side effect of the inventive method, the risk of use of an operator of the mobile radiotelephone system and of the mobile radiotelephone subscriber is reduced since long and expensive calls beyond the control of the mobile radiotelephone subscriber and the mobile radiotelephone system operator can be precluded by the limitation of the calling time in the mobile switching center.

Figure 2:
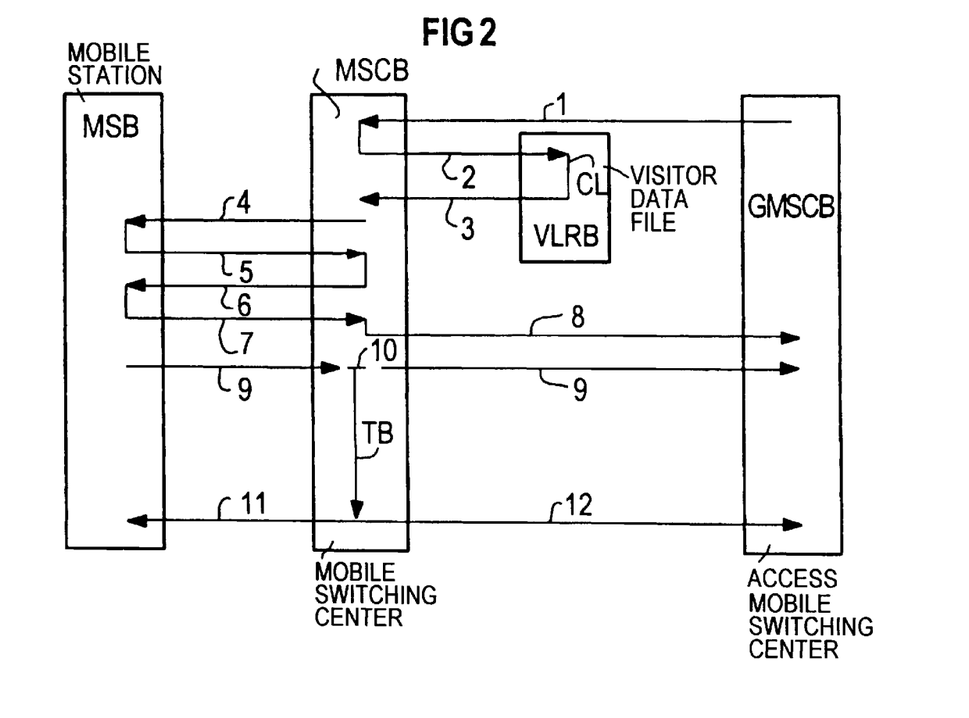
FIG. 2 is a flowchart for the charge monitoring given a call arriving in the mobile station.

FIG. 2 shows the function sequence for monitoring the incurred charges given a call arriving in the mobile station (mobile terminated call). A call is initiated by a fixed network subscriber of the telephone system and the subscriber call number of a mobile radiotelephone subscriber is communicated via a switching equipment of the telephone system to an access mobile switching center GMSCB in the mobile radiotelephone system. The access mobile switching center GMSCB directs an interrogation to a home datafile in which the mobile radiotelephone subscriber is registered with his subscriber data. The home datafile stores information about the momentary location of the called mobile radiotelephone subscriber, that is, in what visited zone the mobile radiotelephone subscriber is located at the moment and what visitor datafile with appertaining mobile switching center is currently responsible for him. A signalling connection is set up from the home datafile to the visitor datafile and a routing number (mobile subscriber roaming number) is requested and received. This routing number is transmitted from the home datafile to the access mobile switching center GMSCB that replaces the subscriber call number of the called mobile radiotelephone subscriber selected via the fixed network subscriber station with the routing number and undertakes an interpretation of the digits of the routing number in order to set up a call connection to the mobile switching center MSCB with appertaining visitor datafile VLRB that is responsible for the called mobile radiotelephone subscriber.

This means that the access mobile switching center GMSCB transmits a message for call setup (initial address message) that, among other things, contains the routing number to the mobile switching center MSCB (1). on the basis of the arriving routing number, the mobile switching center MSCB, which is also referred to a visited mobile switching center, informs the visitor datafile VLRB about the requested call setup to the mobile station MSB of the called mobile radiotelephone subscriber (2). The visitor datafile VLRB sends billing data and a charge limit CL individually defined for the respectively registered mobile radiotelephone subscriber to the mobile switching center MSCB (3). The mobile switching center MSCB starts a radio call reception procedure (paging) for localizing the mobile station MSB of the called mobile radiotelephone subscriber. All base stations that are situated in a specific location area are interrogated. The base stations transmit the radio call reception request via their radio interfaces, whereupon the mobile station MSB of the called mobile radiotelephone subscriber affected by the incoming call returns a reply to the request to the mobile switching center MSCB (5).

After successful implementation of mobility functions, the mobile switching center MSCB begins to send a message for the call setup to the mobile station MSB (6). The message is acknowledged by the mobile station MSB, and a message with a call signal that signals the start of the call connection by actuation of the mobile station MSB is transmitted to the mobile switching center MSCB (7) and is forwarded from the mobile switching center MSCB to the access mobile switching center BMSCB (8). The calling fixed network subscriber is informed about the call signal by his switching equipment. The charge acquisition in the mobile switching center MSCB begins as soon as the mobile radiotelephone subscriber accepts the call connection, recognized by the calling fixed network subscriber on the basis of the communication of a corresponding message from the mobile station MSB to the mobile switching center MSCB, from the latter to the access mobile switching center GMSCB (9) and from the latter in turn to the switching equipment and to the telephone subscriber station in the telephone system.

On the basis of the received charge limit CL and on the basis of the billing data for the call, which is an incoming call in the mobile station MSB from the point of view of the mobile radiotelephone subscriber, the mobile switching center MSCB calculates a limited calling time TB, and a corresponding timer for monitoring the allowed calling time is started (10). When the calculated calling time has expired, the mobile switching center MSCB automatically clears the call down in that a cleardown message is sent to the mobile station MSB (11) and/or to the access mobile switching center GMSCB (12) and from the latter to the fixed network subscriber station of the calling telephone subscriber. A prior visual or acoustic information for the respective subscriber about the impending end of the call connection as a result of having reached the calculated calling time is possible—in the same way as described for FIG. 1.

Figure 3:
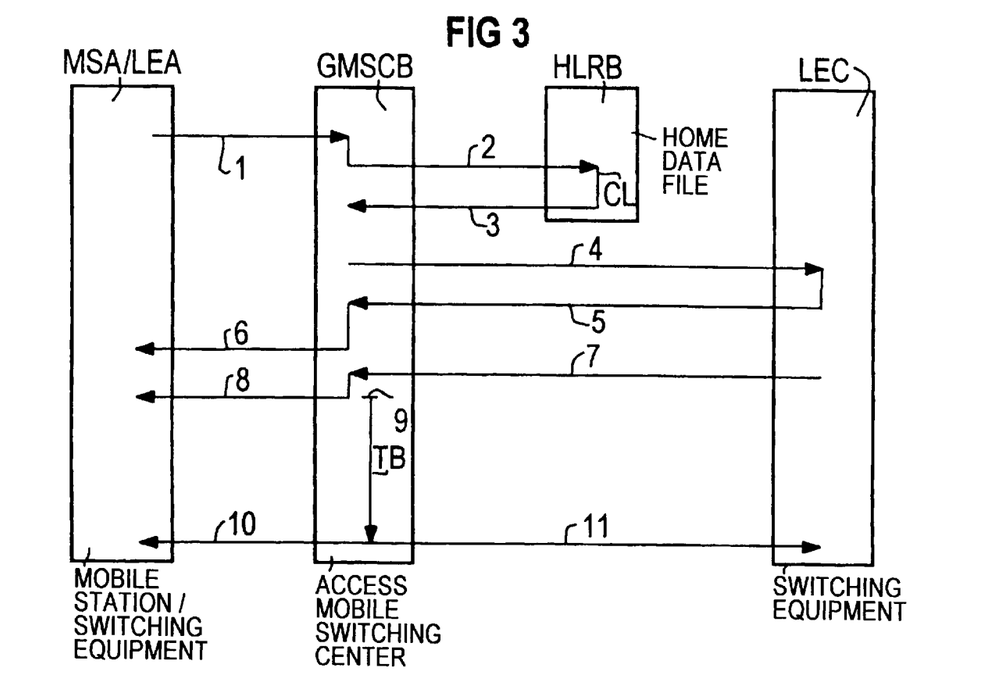
FIG. 3 is a flowchart for the charge monitoring given an unconditional call forwarding.

FIG. 3 shows the function sequence for monitoring the charges given a call that a mobile radiotelephone subscriber forwards to a third party (to a fixed network subscriber of the public telephone system in the present example) on the basis of a call forwarding that has been established for the mobile radiotelephone subscriber. A distinction can thereby be made between an unconditional call forwarding (call forwarding unconditional), a call forwarding given a busy subscriber (call forwarding on mobile subscriber busy), a call forwarding given no reception of an answer within a specific time (call forwarding on no reply) and a call forwarding given an unreachable subscriber (call forwarding on mobile subscriber not reachable). The "call forwarding" service usable by the mobile radiotelephone subscriber is controlled by the respective mobile radiotelephone subscriber himself, this meaning that he himself activates and deactivates the service and can input a destination call number to which the call should be forwarded. The function sequence according to FIG. 3 is valid for an unconditional call forwarding, a call forwarding on mobile subscriber not reachable or for a call forwarding on mobile subscriber busy when the busy status of the mobile radiotelephone subscriber can be determined in his home datafile. The equipment affects by the message flow are composed of the mobile station MSA of a calling mobile radiotelephone subscriber or of the subscriber station of a calling fixed network subscriber connected to a switching equipment LEA of the public telephone system, of an access mobile switching center GMSCB and a home datafile HLRB in the mobile radiotelephone system of the called mobile radiotelephone subscriber for whom the call forwarding is activated, as well as of a switching equipment LEC that is provided in the public telephone system for the third party (a fixed network subscriber in the present example). When the third party is a mobile radiotelephone subscriber, the switching equipment LEC is formed of a mobile switching center.

The access mobile switching center GMSCB can recognize the call directed to the mobile radiotelephone subscriber based on the reception of a message for call setup. In response thereto, the access mobile switching center GMSCB interrogates the home datafile HLRB in order to obtain information for setting up the call connection to the called mobile radiotelephone subscriber (2). In response thereto, the home datafile HLRB edits billing data and a charge limit CL individually defined for the mobile radiotelephone subscriber and transmits these to the access mobile switching center GMSCB. Upon receipt of the interrogation from the access mobile switching center GMSCB, further, the home datafile implements a number of check procedures that are directed to the call forwarding established for the called mobile radiotelephone subscriber. When, on the basis of the subscriber data stored for the mobile radiotelephone subscriber, an unconditional call forwarding or a call forwarding given unreachable mobile radiotelephone subscriber (because, for example, the mobile radiotelephone subscriber is in an unallowed location area or no number is available for a visitor datafile currently responsible for the mobile radiotelephone subscriber or the mobile station of the called mobile radiotelephone subscriber is turned off) is present, the home datafile HLRB sends the destination call number of the third party to whom the call is forwarded and an information about the reason for the call forwarding back to the access mobile switching center GMSCB (3).

Based on the received destination call number of the third party, the access mobile switching center GMSCB interprets the arriving digits of the new call destination and transmits a message for the setup of the call connection to the switching equipment LEC (4). The rest of the function sequence ensues in the same way as the function sequence according to FIG. 1 that is valid for a call departing the mobile station MSA between a calling mobile radiotelephone subscriber and a called fixed network subscriber. The switching equipment LEC thus transmits the call signal that signals the setup of the call connection to the destination subscriber to the calling subscriber to the access mobile switching center GMSCB (5), and the call signal is forwarded from the latter to the mobile station MSA or, respectively, to the switching equipment LEA (6).

Finally, the switching equipment LEC signals the actuation of the fixed network subscriber station of the third party by sending a corresponding message to the access mobile switching center that forwards this message to the mobile station MSA or to the switching equipment LEA (8). The access mobile switching center GMSCB starts the charge acquisition with the reception of this message since a through connection is set up between the calling mobile radiotelephone subscriber or the calling fixed network subscriber and the third party to whom the call was forwarded from the originally called mobile radiotelephone subscriber. Together with the charge acquisition, the access mobile switching center GMSCB calculates a limited calling time TB from the received billing data and from the arriving charge limit CL and a timer is started for monitoring this allowed call duration (9). When the call connection is not prematurely ended before the expiration of the limited calling time TB, the access mobile switching center GMSCB automatically clears down the call. To this end, it sends a cleardown message to the mobile station MSA or to the switching equipment LEA (10) and/or to the switching equipment LEC of the third party (11).

Figure 4:
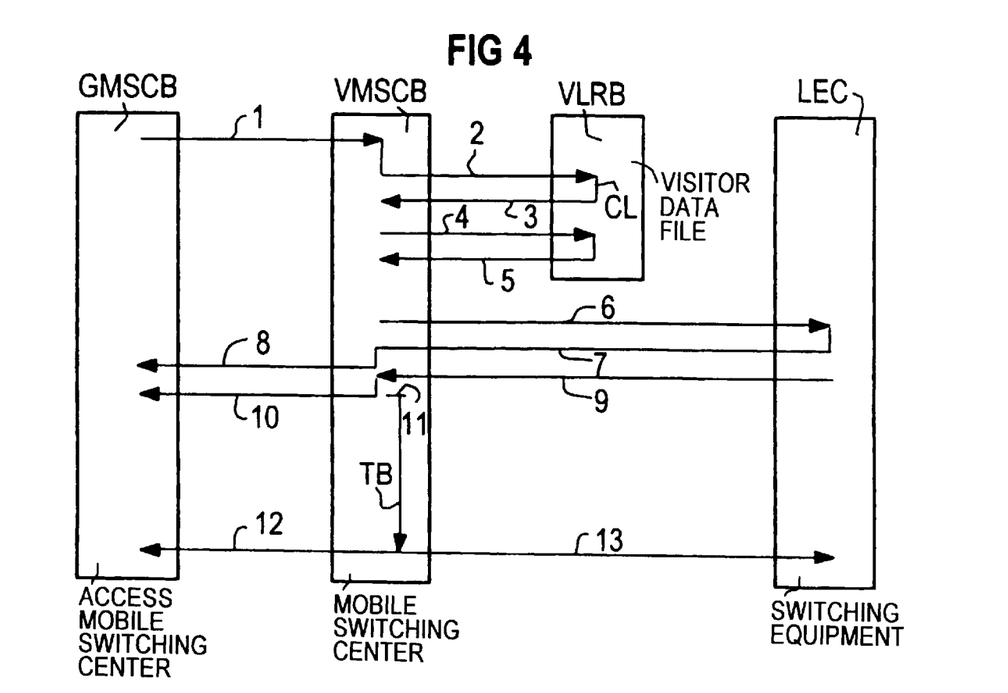
FIG. 4 is a flowchart for the charge monitoring given a call forwarding because the mobile radiotelephone subscriber is busy.

FIG. 4 shows the function sequence given a forwarded call for that case wherein a connection must first be set up to the mobile switching center VMSCB responsible for the called mobile radiotelephone subscriber. This is necessary for the call forwarding given a busy subscriber and when there is no answer in time or when the mobile radiotelephone subscriber cannot be reached, when the radio links are overloaded or when no radio call is received. Instead of the destination call number of the third party, the home datafile shown in FIG. 3 and in which the call forwarding for the called mobile radiotelephone subscriber is registered fetches a routing number (Mobile Subscriber Roaming Number) from the visitor datafile VLRB storing the subscriber data of the mobile radiotelephone subscriber and transmits this routing number to the access mobile switching center GMSCB.

The access mobile switching center GMSCB transmits the received routing number to the mobile switching center VMSCB currently responsible for the mobile radiotelephone subscriber in a message for the call setup (1). The mobile switching center VMSCB requests the subscriber data of the mobile radiotelephone subscriber from the appertaining visitor datafile VLRB in order to check the services registered for him from the presence of the "call forwarding" service (2). After transmitting the parameters defining the type of call forwarding, the mobile switching center VMSCB defines the further procedure for setting up th e call connection. over and above this, the visitor datafile VLRB transmits the billing data and the charge limit CL to the mobile switching center VMSCB. Dependent on the status recognizable with reference to the subscriber data stored in the visitor datafile VLRB, the mobile switching center VMSCB access the visitor datafile VLRB again in order to receive the destination call number of the third party coupled to the "call forwarding" service (4). The destination call number, with reference whereto the further call setup for the call connection is required, is subsequently send from the visitor datafile VLRB to the requesting mobile switching center VMSCB (5).

The rest of the function sequence ensues in the same way is in the function sequence according to FIG. 3. Thus, the message for the call setup is sent from the mobile switching center VMSCB to the switching equipment LEC (6) from which the call signal for signalling the set up of a call connection to the third party is returned to the mobile switching center VMSCB (7) and is forwarded from the latter to the access mobile switching center GMSCB (8). The message with which the acceptance of the call connection by the third party is signalled is received by the mobile switching center VMSCB from the switching equipment LEC (9) and forwards it to the access mobile switching center GMSCB (10). Upon receipt of this message, the charge acquisition begins in the mobile switching center VMSCB. At the same time, a timer is started for monitoring a limited calling time TB calculated by the mobile switching center VMSCB (11). The allowed call duration is calculated by the mobile switching center VMSCB on the basis of the communicated charge limit CL and on the basis of the communicated billing data. Upon expiration of the maximum calling time calculated for the forwarded call after the call forwarding, the call is automatically cleared down in that a cleardown message is transmitted from the mobile switching center VMSCB to the access switching center GMSCB and/or to the switching equipment LEC (12,13).

Figure 5:
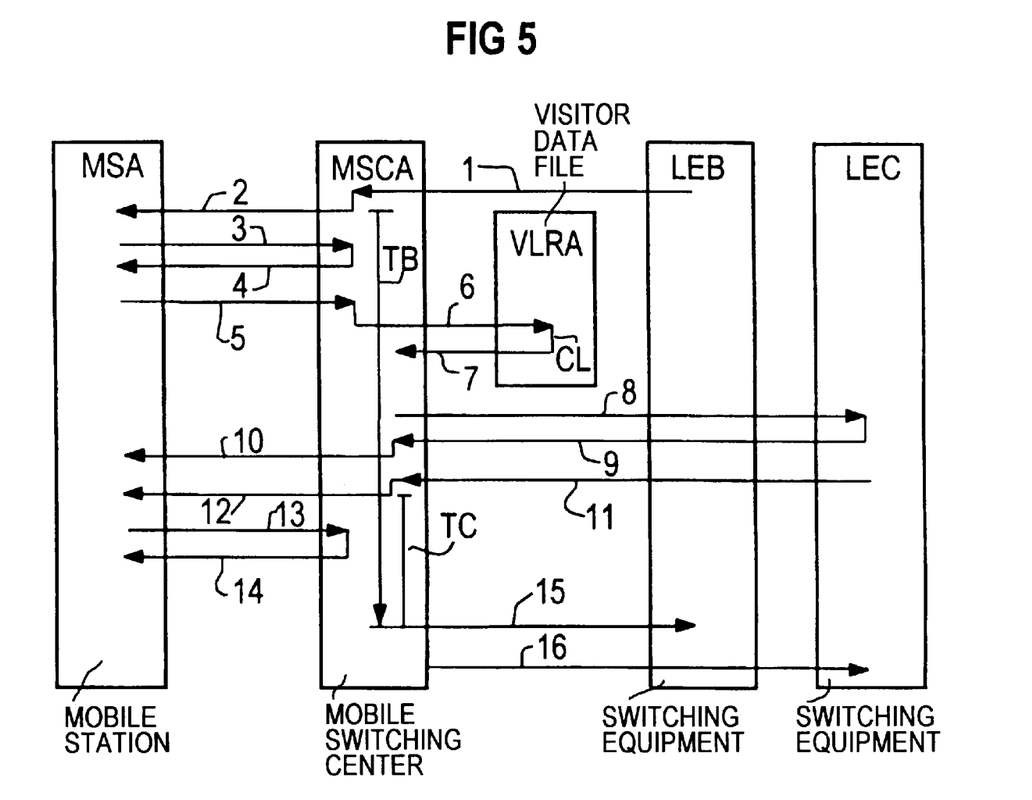
FIG. 5 is a flowchart for the charge monitoring given a call transfer.

FIG. 5 shows the function sequence for monitoring the charges given a call that arrives at the mobile radiotelephone subscriber during a call that already exists and is transferred to a third subscriber on the basis of the service "Call Transfer". Given call transfer, the mobile radiotelephone subscriber has the possibility of setting up a connection between two remote subscribers and subsequently clearing down the already existing connection with one of the two remote subscribers. The apparatus affected by the executive sequence are composed of the mobile station MSA of a mobile radiotelephone subscriber, the mobile switching center MSCA with visitor datafile VLRA responsible for the mobile radiotelephone subscriber, the switching equipment LEB provided for a first fixed network subscriber and the switching equipment LEC provided for a second fixed network subscriber. When mobile radiotelephone subscribers are involved in the call connection instead of fixed network subscribers, the switching equipment LEB and LEC are composed of mobile switching centers.

A call connection whose charge acquisition by the mobile switching center MSCA begins upon reception of the message sent by the switching equipment LEB that signals the through connection to the fixed network subscriber is already present between the mobile radiotelephone subscriber and the first fixed network subscriber (1). The message arrives in the mobile switching center MSCA that, on the one hand, forwards the message to the mobile station MSA of the mobile radiotelephone subscriber (1) and, on the other hand, calculates a limited calling time TB for the first call in which the mobile radiotelephone subscriber is involved. The calculation of the maximally possible call duration ensues on the basis of billing data that were already offered by the visitor datafile VLRA upon setup of the call connection between the mobile radiotelephone subscriber and the first fixed network subscriber. When the mobile radiotelephone subscriber uses the "Call Transfert" service, the existing call connection is placed on hold (call hold) in that a corresponding message is sent to the mobile switching center MSCA (3) and a reply that signals the holding of the existing call connection is returned to the mobile station MSA (4).

After the holding of the call connection set up between the mobile radiotelephone subscriber and the first fixed network subscriber, the message for call setup with a third subscriber is transmitted to the mobile switching center MSCA from the mobile station MSA. The mobile switching center MSCA requests the billing data and the charge limit CL from the appertaining visitor datafile VLRA for the transferred call (6), these being returned to the requesting mobile switching center MSCA (7). After reception of these data, the mobile switching center MSCA sends the message for the call setup to the switching equipment LEC of the second fixed network subscriber, from which the reply signal for signalling the existing connection with the second fixed network subscriber is transmitted back to the mobile switching center MSCA in the mobile radiotelephone system as reply to the message (9). The call signal is forwarded from the mobile switching center MSCA to the mobile station MSA of the mobile radiotelephone subscriber (10). A message that identifies the acceptance of the call connection is also sent from the switching equipment LEC to the mobile switching center MSCA (11) and is communicated from the latter to the mobile station MSA (12).

The charge acquisition for the call connection between the first fixed network subscriber and the second fixed network subscriber begins in the mobile switching center MSCA upon reception of this message, whereby a further, limited calling time TC is calculated by the mobile switching center MSCA on the basis of the communicated billing data and the received charge limit CL, and a further timer is started for monitoring the limited calling time TC. For implementation of the call transfer service usable by the mobile radiotelephone subscriber, the mobile station MSA sends a request that identifies the desired service to the mobile switching center MSCA (13). A message that contains the result of the service used and effects the cleardown of the call for the mobile radiotelephone subscriber is transmitted from the mobile switching center MSCA to the mobile station MSA (14).

As soon as one of the two limited calling times TB,TC has expired, the mobile switching center MSCA transmits a cleardown message to the switching equipment LEB (15) and a further cleardown message to the switching equipment LEC (16) in order to automatically clear down the new call connection between the two fixed network subscribers that has arisen on the basis of the call transfer.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for monitoring fees arising for calls in a mobile radiotelephone system having mobile stations, base stations and mobile switching centers, the mobile radiotelephone system also having datafiles for storing subscriber data of mobile radiotelephone subscribers, comprising the steps of:

defining in a datafile a charge limit and providing billing data for every individual call in the mobile radiotelephone system;

calculating in a mobile switching center a limited calling time for a respective call based on the charge limit and the billing data; and starting in the mobile switching center a monitoring function with which the respective call is automatically cleared down after expiration of the limited calling time, and given a call transfer established for a respective mobile radiotelephone subscriber wherein the mobile radiotelephone subscriber accepts a call from a third subscriber during a call that has already been set up or directs it to a third subscriber, the charge limit being offered by a visitor datafile storing the subscriber data of the mobile radiotelephone subscriber and being transmitted to the mobile switching center responsible for the respective mobile radiotelephone subscriber that calculates the limited calling time for the call transferred to the third subscriber, starts the monitoring function and sends at least one cleardown message as soon as one of the limited calling times has expired.

2. The method according to claim 1, wherein, given a call departing from a calling mobile station or, respectively, arriving at a called mobile station, the charge limit is offered by a visitor datafile of said datafiles, said visitor datafiles storing subscriber data of the calling mobile radiotelephone subscriber or, respectively, subscriber data of the called mobile radiotelephone subscriber, said subscriber data being transmitted to a mo bile switching center responsible for the calling, or, respectively called mobile radiotelephone subscriber that calculates the limited calling time, the mobile switching center transmitting a cleardown message after expiration of the limited calling time.

3. The method according to claim 1, wherein, given a call forwarding established for a respective mobile radiotelephone subscriber, the charge limit and forwarding data are offered by a visitor datafile that stores the subscriber data of the respective mobile radiotelephone subscriber and are transmitted to the mobile switching center responsible for the respective mobile radiotelephone subscriber that calculates the limited calling time, starts the monitoring function and transmits a cleardown message after expiration of the limited calling time.

4. The method according to claim 3, wherein the mobile switching center sends the cleardown message to a mobile station of a calling mobile radiotelephone subscriber in the mobile radiotelephone system.

5. The method according to claim 3, wherein the mobile switching center sends the cleardown message to a fixed network subscriber station of a calling subscriber in a line-bound communication network.

6. The method according to claim 1, wherein, given a call forwarding established for a respective mobile radiotelephone subscriber, the charge limit and forwarding data is offered by a home datafile that stores the subscriber data of the mobile radiotelephone subscriber, the forwarding data being transmitted to a mobile switching center that calculates the limited calling time, starts the monitoring function and transmits a cleardown message after expiration of the limited calling time.

7. The method according to claim 6, wherein the mobile switching center sends the cleardown message to a mobile station of a calling mobile radiotelephone subscriber in the mobile radiotelephone system.

8. The method according to claim 6, wherein the mobile switching center sends the cleardown message to a fixed network subscriber station of a calling subscriber in a line-bound communication network.

9. The method according to claim 1, wherein the mobile switching center sends a cleardown message to a switching equipment provided for the other subscriber involved in the call.

10. The method according to claim 1, wherein visual or acoustic information about an impending cleardown of the call is sent by the mobile switching center before expiration of the limited calling time.

11. The method according to claim 10, wherein, given a call departing from a calling mobile station or, respectively, arriving at a called mobile station, the charge limit is offered by a visitor datafile of said datafiles, said visitor datafiles storing subscriber data of the calling mobile radiotelephone subscriber or, respectively, subscriber data of the called mobile radiotelephone subscriber, said subscriber data being transmitted to a mobile switching center responsible for the calling, or, respectively called mobile radiotelephone subscriber that calculates the limited calling time, the mobile switching center transmitting a cleardown message after expiration of the limited calling time, and wherein, after reception of the information about an impending cleardown of the call by the mobile station, the limited calling time is automatically extended by transmission of a short message to the mobile switching center or by using a corresponding service in the mobile radiotelephone system.

12. A system for monitoring fees arising for calls in a mobile radiotelephone system having mobile stations, base stations and mobile switching centers, said mobile radiotelephone system also having datafiles for storing subscriber data of mobile radiotelephone subscribers comprising:

a predefined charge limit and billing data stored in a datafile for every individual call in the mobile radiotelephone system;

a calculated limited calling time for a respective call, the limited calling time being calculated in a mobile switching center from the charge limit and the billing data; and a monitoring function that is started by the mobile switching center with the call, the call being automatically cleared down after expiration of the limited calling time.

13. A method for monitoring fees arising for calls in a mobile radiotelephone system having mobile stations, base stations and mobile switching centers, the mobile radiotelephone system also having datafiles for storing subscriber data of mobile radiotelephone subscribers, comprising the steps of:

defining in a datafile a charge limit and providing billing data for every individual call in the mobile radiotelephone system;

calculating in a mobile switching center a limited calling time for a respective call based on the charge limit and the billing data; and starting in the mobile switching center a monitoring function with which the respective call is automatically cleared down after expiration of the limited calling time, and given a call transfer established for a respective mobile radiotelephone subscriber wherein the mobile radiotelephone subscriber accepts a call from a third subscriber during a call that has already been set up or directs it to a third subscriber, the charge limit being offered by a visitor datafile storing the subscriber data of the mobile radiotelephone subscriber and being transmitted to the mobile switching center responsible for the respective mobile radiotelephone subscriber that calculates the limited calling time for the call transferred to the third subscriber, starts the monitoring function and sends at least one cleardown message as soon as one of the limited calling times has expired.

14. The method according to claim 13, wherein the mobile switching center sends the cleardown message to a mobile station of a calling mobile radiotelephone subscriber in the mobile radiotelephone system.

15. The method according to claim 13, wherein the mobile switching center sends the cleardown message to a fixed network subscriber station of a calling subscriber in a line-bound communication network.

16. The method according to claim 13, wherein the mobile switching center sends a cleardown message to a switching equipment provided for the other subscriber involved in the call.

17. The method according to claim 13, wherein visual or acoustic information about an impending cleardown of the call is sent by the mobile switching center before expiration of the limited calling time.

18. The method according to claim 13, wherein, given a call departing from a calling mobile station or, respectively, arriving at a called mobile station, the charge limit is offered by a visitor datafile of said datafiles, said visitor datafiles storing subscriber data of the calling mobile radiotelephone subscriber or, respectively, subscriber data of the called mobile radiotelephone subscriber, said subscriber data being transmitted to a mobile switching center responsible for the calling, or, respectively called mobile radiotelephone subscriber that calculates the limited calling time, the mobile switching center transmitting a cleardown message after expiration of the limited calling time and wherein after reception of the information about an impending cleardown of the call by the mobile station, the limited calling time is automatically extended by transmission of a short message to the mobile switching center or by using a corresponding service in the mobile radiotelephone system.

* * * * *